(No Model.)

O. L. DUNTON.
DIVIDED HUB OR PULLEY.

No. 412,735. Patented Oct. 15, 1889.

Witnesses.
Selma R. Schelin
Geo. W. White

Inventor
Orravill L. Dunton
by Alban Andrew his atty.

UNITED STATES PATENT OFFICE.

ORRAVILL L. DUNTON, OF BROCKTON, MASSACHUSETTS, ASSIGNOR OF ONE-HALF TO THOMAS F. SULLIVAN, OF SAME PLACE.

DIVIDED HUB OR PULLEY.

SPECIFICATION forming part of Letters Patent No. 412,735, dated October 15, 1889.

Application filed March 14, 1889. Serial No. 303,212. (No model.)

*To all whom it may concern:*

Be it known that I, ORRAVILL L. DUNTON, a citizen of the United States, and a resident of Brockton, in the county of Plymouth and State of Massachusetts, have invented new and useful Improvements in Divided Hubs or Pulleys, of which the following, taken in connection with the accompanying drawings, is a specification.

In divided pulleys having the sections tongued and grooved together, as heretofore constructed, the tongues and grooves extend the entire length of the hub, and consequently to disconnect the parts it becomes necessary to move the hub-sections longitudinally one upon the other a distance equal to the full length of the hub. This construction is objectionable in that it can only be used in such positions as permit the required longitudinal movement of the sections a distance equal to the length of the hub, and hence cannot be employed for the purposes intended where the pulley is located between fixed bearings with but little space for the longitudinal movement of the hub-sections.

The objects of my invention are to avoid the necessity of moving the hub-sections the full length of the hub to detach the same, to provide a novel construction whereby the hub-sections can be separated or unlocked by a very slight longitudinal movement of one section upon the other, and to permit the pulley being detached when employed between bearings which admit of but a very small longitudinal movement of the hub-sections.

The objects of my invention I accomplish by the novel features of construction and combination of devices hereinafter described and claimed, reference being made to the accompanying drawings, in which—

Figure 1:
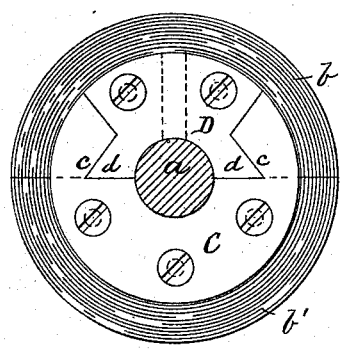
Figure 2:
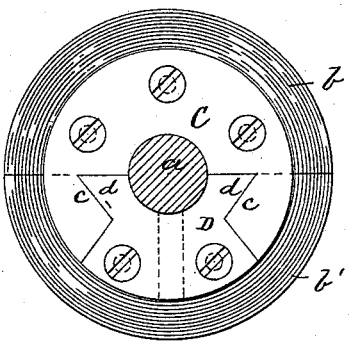
Figure 3:
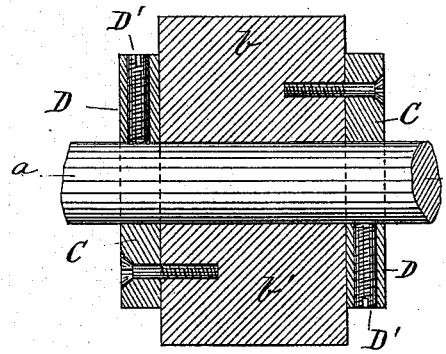
Figure 4:
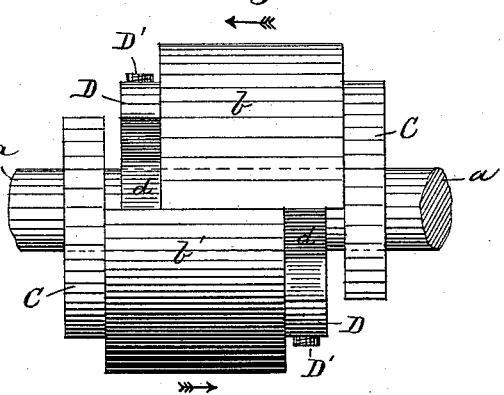
Figure 5:
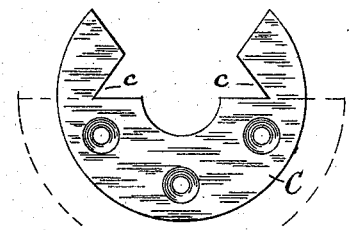

Figure 1 represents an end view of the improved divided hub or pulley, and Fig. 2 represents a similar view as seen from the opposite end thereof. Fig. 3 represents a central longitudinal section of the invention shown as attached to a shaft or spindle. Fig. 4 represents a side elevation of the two parts of the hub or pulley when detached from each other; and Figs. 5 and 6 represent detail views, respectively, of the male and female locking-plates.

Similar letters refer to similar parts wherever they occur on the different parts of the drawings.

$a$ represents a shaft or spindle, and $b\ b'$ represent the semi-cylindrical hub or pulley parts that are to be secured to said shaft or spindle.

Figure 6:
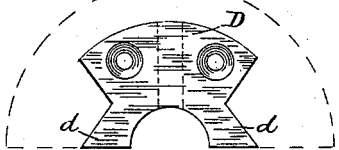

In connection with said divided hub or pulley parts I use female locking-plates C (shown in detail in Fig. 5) and male locking-plates D, as shown in detail in Fig. 6. Each female locking-plate C has dovetailed recesses $c\ c$, adapted to receive corresponding dovetailed projections $d\ d$ on the male plate D, as shown in Figs. 1, 2, 5, and 6. To one end of the pulley or hub part $b$ is secured the male locking-plate D, and to its opposite end is secured the female locking-plate C, as shown in Figs. 1, 2, 3, and 4. The said locking-plates may be secured in a suitable manner, preferably by means of screws, as shown in the drawings, to the ends of the divided hub or pulley parts; or they may be cast in one piece with such respective hub or pulley parts, if the latter are made of metal, without departing from the essence of the invention.

By means of set-screws $D'\ D'$, preferably going through screw-threaded perforations in the male locking-plates D D, the device is secured to the shaft or spindle $a$; but, if so desired, said set-screws may be screwed through one or both of the female locking-plates C or the pulley or hub parts $b\ b'$ to equal advantage, if so desired.

To secure the hub or pulley in position on the shaft or spindle $a$, the parts $b$ and $b'$ are placed in position on the said shaft or spindle, as shown in Fig. 4, after which said hub or pulley parts are moved longitudinally on such shaft or spindle in the direction of arrows shown in said figure until the dovetailed projections $d\ d$ on the male locking-plates D D are introduced into the dovetailed recesses $c\ c$ in the female locking-plates C C, as shown in Figs. 1, 2, and 3, after which said locking-plates and their divided hub or pulley parts are secured to the shaft or spindle $a$ by means of the set-screws $D'\ D'$, as above mentioned.

By this simple arrangement a hub or pulley can be secured to a shaft between bearings or detached therefrom whenever so desired without removing said shaft from its bearings.

Having thus fully described the nature, construction, and operation of the invention, I wish to secure by Letters Patent, and claim—

A hub or pulley divided longitudinally into two sections, each having at one end a laterally-projecting female locking-plate and at its opposite end a laterally-projecting male locking-plate, which male plates respectively interlock with the female locking-plates when one hub-section is moved into proper position on the other hub-section, substantially as described.

In testimony whereof I have signed my name to this specification, in the presence of two subscribing witnesses, on this 15th day of February, A. D. 1889.

ORRAVILL L. DUNTON.

Witnesses:
C. D. FULLERTON,
T. F. SULLIVAN.